(No Model.)  2 Sheets—Sheet 1.

L. B. BERKLY.
WAGON.

No. 265,739.  Patented Oct. 10, 1882.

Witnesses:
A. M. Long
W. J. Osgood

Inventor.
Lewis B. Berkly
Howard A. Snow.
Atty

N. PETERS. Photo-Lithographer. Washington, D. C.

(No Model.)
2 Sheets—Sheet 2.
L. B. BERKLY.
WAGON.
No. 265,739. Patented Oct. 10, 1882.
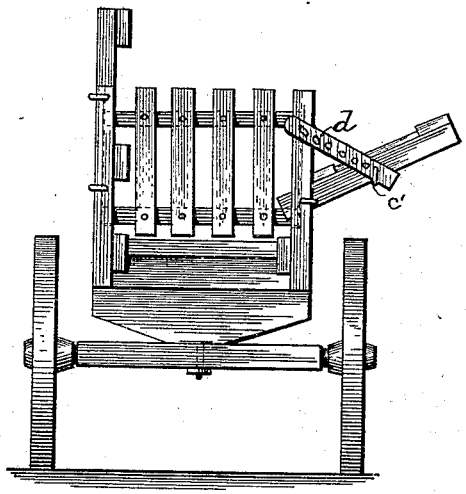
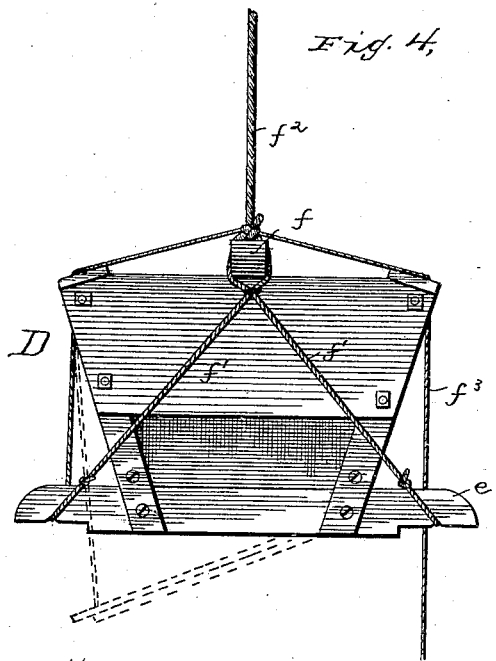
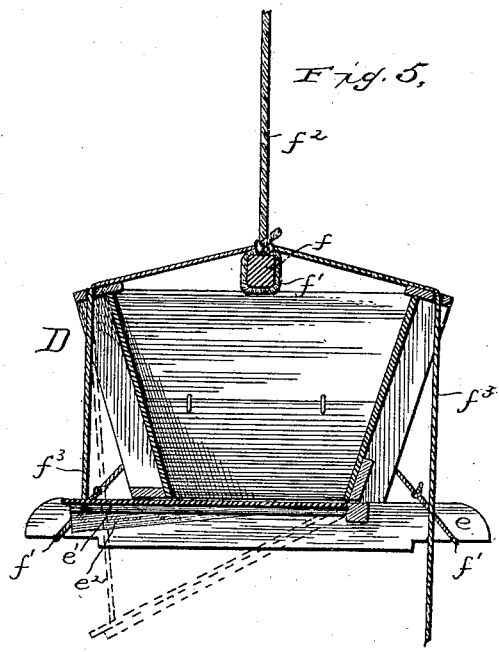

UNITED STATES PATENT OFFICE.

LEWIS B. BERKLY, OF WATERLOO, IOWA.

WAGON.

SPECIFICATION forming part of Letters Patent No. 265,739, dated October 10, 1882.

Application filed August 12, 1882. (No model.)

*To all whom it may concern:*

Be it known that I, LEWIS B. BERKLY, a citizen of the United States, residing at Waterloo, in the county of Black Hawk and State of Iowa, have invented certain new and useful improvements in wagons for transportation of hay and animals, and for unloading corn and other grain into cribs and garners from said wagons, of which the following is a specification, reference being had therein to the accompanying drawings.

This invention has relation to improvements in farm-wagons, and has for its object to provide a wagon the several parts of which may readily be changed to adapt it to the different uses arising in the prosecution of farm-work.

It consists in constructing the sides of the body in sections, having their lower sides pivoted to the wagon-bed, or to posts extended therefrom, and their upper sides adjustable to and from a vertical line, and means whereby these sections may be held at any suitable angle to the wagon-bed.

It consists, further, in the combination, with the wagon having the removable sectional sides, of the bins or hoppers for containing and elevating grain and similar substances, constructed as will be hereinafter fully set forth.

It consists, further, in other improvements, all of which will be hereinafter fully set forth, and pointed out in the claims.

Figure 1:
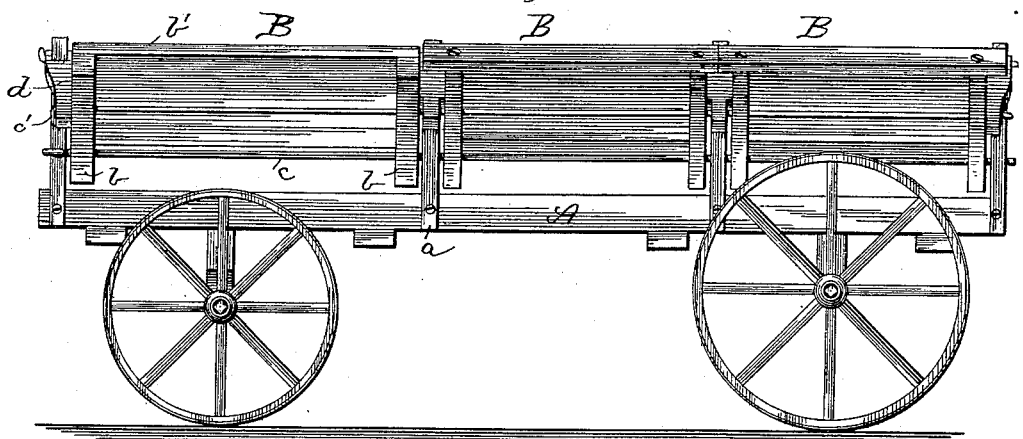
Figure 2:
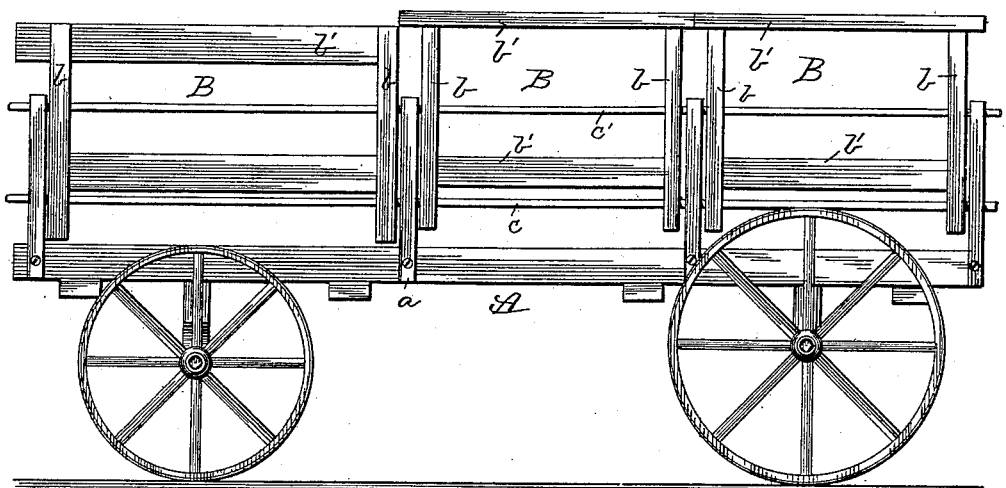

In the drawings, Figures 1 and 2 are side views, and Fig. 3 is an end view, of a wagon containing my improvements; and Figs. 4 and 5 are detail views, showing the grain carrying and elevating hoppers, as will be described.

A represents the side bars of the wagon-bed.

*a* represents standards placed at equal distances along the side of the wagon, and having their lower ends secured to the side bars and their upper ends extended vertically therefrom, as shown. These standards are provided with bolt-holes formed through them near their ends and arranged parallel to the side bars A.

B represents the adjustable sections, composed of the end bars, *b*, and the side bars or slats *b'*. These sections are placed between the standards *a*, and their lower sides are pivoted on a rod, *c*, passed through the lower bolt-holes in the standards *a* and coincident holes near the lower end of the bars *b*. I prefer to use this rod for convenience. It will be understood, however, that separate pins or bolts could be used to pivotally secure each of the bars *b* to the standard *a* adjacent thereto. When so desired, the sections may be hinged directly to the wagon-bed. This construction leaves the upper sides of the sections to turn freely out from the upper end of the standard, and in order to secure these sections in suitable position I employ brace-bars *d*, having one end secured to the standard *a* and their opposite ends extended out and inclined downward at an angle to the said standard, as shown in Fig. 3. When the ordinary wheel-covering boxes are employed this brace is not always necessary. Near the outer end of the brace I form a bolt-hole, through which is passed the rod *c'*, passing through coincident holes formed in the end bars, *b*, of the section B, and secured by the same to the bar *d*, and in position as shown in Fig. 3. It may be useful at times to provide the bar *d* with a series of bolt-holes, as indicated in dotted lines, Fig. 3, so that the section may be held at any desired angle to the standards *a*. Instead of the rod *c'*, separate bolts may be used, as will be understood. I adjust the sections B out at angles to the standards, as shown in Figs. 1 and 3, to adapt the wagon to carry hay, straw, fodder, or similar articles. When desired, the sections may be turned to a line parallel to the standards *a*, as shown in Fig. 2, and secured by the rod *c'*, passed through the upper bolt-holes in standards *a* and the bar *b* of the sections. When the sections are in this position the wagon is adapted for the conveyance of cordwood and the smaller animals, such that are not winged or accustomed to jumping barriers. When such are to be carried I use a cover over the top of the wagon. The bottom boards of the wagon are made removable to readily adapt the same for the different purposes for which it is to be used. When so desired, the ends of the wagon may be made adjustable, as are the sections B, and when so constructed the wagon may be lengthened to such extent as the ends will permit.

I sometimes provide partitions extended across the wagon-body between the opposite standards, so that the wagon may be divided to carry several different varieties of articles, the adjustable sections adapting it for such purpose, as will be hereinafter described.

It is often desirable to provide means for conveying grain or corn in ears, &c., in a wagon, so that they may be readily elevated and dumped into a bin or mow in a barn or crib. For this purpose I provide the hoppers or boxes D, the construction of which I will now describe.

$e$ represents the base-beams, made of a length equal the width of the wagon-bed, and having their ends cut away on the under side to provide notches which rest down over the side bars A of the wagon-bed to secure the box firmly in place on the wagon. These boxes are made usually of a length about equal to the sections B. Their sides are slanted, as shown in Figs. 4 and 5, so that the grain will readily run out when the hinged bottom is opened, as will be described. $e'$ represents the bottom of the hopper. One of its sides is hinged at one side of the bottom of the hopper, and its other side is free to swing down, as indicated in dotted lines, Figs. 4 and 5.

$e^2$ represents canvas, cloth, or similar substances connecting the ends of the hopper and the bottom $e'$, so that the latter can be swung down, as indicated, yet providing a cover at the ends to prevent the contents scattering when the bottom is dropped. The ends of the hopper are preferably made of sheet-iron, though boards may be used.

It is sometimes convenient to use the sections B in making the hopper by lining them with sheet-iron or canvas and properly securing them to the base-beams $e$. When it is not desired to use the hopper for grain or other small articles the sections may be used without any lining.

$f$ represents a bar extending centrally from end to end above the hopper, and secured thereto by ropes $f'$, made fast to the ends of the beams $e$ and bar $f$, as shown.

$f^2$ represents a rope secured to the bar $f$ midway the ends of the box, and adapted to be passed over a pulley properly arranged in the upper part of the barn or crib when it is desired to elevate the box.

$f^3$ represents a rope having one end made fast to the swinging side of the door and its other end carried over the box or hopper and brought down to the ground, as shown, so that the bottom may be held from dropping when the box is being elevated by means of the rope $f^2$. When the box has been elevated to the delivery-point the rope $f^3$ is slacked and the bottom drops, permitting the contents to run out. When the box is on the wagon the bottom $e'$ is rested against the wagon-bed, and is thereby prevented from dropping.

The operation of my invention will be readily understood from the description given on reference to the drawings. By means of the removable sections B and the hoppers or boxes D the farmer may carry a load of hay, straw, or fodder in one part of his wagon, a hopper or box of grain in another part, and some of the smaller animals in another part. The sections B being easily removable by the construction and arrangement described facilitates the adaptation of the wagon for the purpose of conveying the various articles as named.

What I claim is—

1. The combination of the wagon-body A, standards $a$, adjustable sections B, and the guide-rods $d$, provided with a series of holes, whereby the sections B are made adjustable between the standards $a$, substantially as shown and described.

2. The combination, with the wagon having the removable side sections B, of the hoppers or boxes D, adapted to be placed on the wagon-bed with the base-beams $e$ rested down on the side bars A, and provided with the hinged bottom $e'$, and the elevating-rope $f^2$, substantially as shown and described.

In testimony whereof I affix my signature in presence of two witnesses.

LEWIS B. BERKLY.

Witnesses:
EDGAR R. RILL,
JOS. M. SAYLOR.